(12) United States Patent
Merzon et al.

(10) Patent No.: US 10,462,523 B2
(45) Date of Patent: Oct. 29, 2019

(54) PRESENTING LINEAR AND NONLINEAR CONTENT VIA DVR

(71) Applicant: Microsoft Technology Licensing, LLC, Redmond, WA (US)

(72) Inventors: Alan Merzon, San Jose, CA (US); Tim Herby, Los Altos, CA (US); Christopher Habliston, San Jose, CA (US); Antonio Fontan, San Jose, CA (US); Chris Welden, Mountain View, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/744,402

(22) Filed: Jun. 19, 2015

(65) Prior Publication Data
US 2015/0289019 A1    Oct. 8, 2015

Related U.S. Application Data

(62) Division of application No. 13/292,897, filed on Nov. 9, 2011, now Pat. No. 9,077,947.

(51) Int. Cl.
*H04N 21/84*    (2011.01)
*H04N 21/462*    (2011.01)
(Continued)

(52) U.S. Cl.
CPC ..... *H04N 21/4622* (2013.01); *H04N 5/44543* (2013.01); *H04N 5/76* (2013.01);
(Continued)

(58) Field of Classification Search
CPC ....... H04N 21/47202; H04N 21/47208; H04N 21/47217
(Continued)

(56) References Cited

U.S. PATENT DOCUMENTS 6,601,238 B2    7/2003   Morrison et al.
6,681,396 B1    1/2004   Bates et al.
(Continued)

OTHER PUBLICATIONS

May, Steve, "Virgin Media Tivo vs Sky HD: Which is Best for You?", http://www.techradar.com/news/television/virgin-media-tivo-vs-sky-hd-which-is-best-for-you--940189, Published on Apr. 4, 2011, Retrieved on Aug. 17, 2011, 4 pages.
(Continued)

*Primary Examiner* — Hunter B Lonsberry
*Assistant Examiner* — Franklin S Andramuno
(74) *Attorney, Agent, or Firm* — Alleman Hall Creasman & Tuttle LLP

(57)    ABSTRACT

Embodiments related to the presentation of linear content and non-linear content in an integrated user experience are disclosed. One embodiment provides a method of identifying linear content and non-linear content for presentation via a video recording device. The method includes detecting a trigger to perform a search for content items, and providing, responsive to the trigger, a search request to one or more metadata sources, each metadata source containing locations of one or more of linear content items and non-linear content items available at one or more content sources. The method further includes receiving from each metadata source a search response including metadata associated with available content at one or more of the content sources, and outputting a list of content items identifying one or more linear content items and one or more non-linear content items from one or more metadata sources.

15 Claims, 9 Drawing Sheets

(51) Int. Cl.

| | | |
|---|---|---|
| *H04N 21/262* | (2011.01) | |
| *H04N 21/472* | (2011.01) | |
| *H04N 5/76* | (2006.01) | |
| *H04N 5/445* | (2011.01) | |
| *H04N 21/433* | (2011.01) | |
| *H04N 21/442* | (2011.01) | |
| *H04N 21/466* | (2011.01) | |
| *H04N 21/4147* | (2011.01) | |
| *H04N 21/488* | (2011.01) | |
| *H04N 21/431* | (2011.01) | |
| *H04N 21/475* | (2011.01) | |

(52) U.S. Cl.
CPC ... *H04N 21/26275* (2013.01); *H04N 21/4147* (2013.01); *H04N 21/4334* (2013.01); *H04N 21/44222* (2013.01); *H04N 21/4668* (2013.01); *H04N 21/47202* (2013.01); *H04N 21/47217* (2013.01); *H04N 21/4882* (2013.01); *H04N 21/84* (2013.01); *H04N 21/4312* (2013.01); *H04N 21/4755* (2013.01); *H04N 21/47214* (2013.01)

(58) Field of Classification Search
USPC .......................................... 725/89, 134, 142
See application file for complete search history.

(56) References Cited

U.S. PATENT DOCUMENTS

| | | | | |
|---|---|---|---|---|
| 7,103,668 | B1 * | 9/2006 | Corley | H04L 29/06027 709/231 |
| 8,103,707 | B2 | 1/2012 | Moon et al. | |
| 8,448,208 | B2 | 5/2013 | Moreau et al. | |
| 8,624,908 | B1 * | 1/2014 | Knee | G09G 5/003 345/537 |
| 9,215,420 | B2 | 12/2015 | Suslov | |
| 2002/0147984 | A1 * | 10/2002 | Tomsen | H04N 5/4401 725/109 |
| 2006/0004765 | A1 * | 1/2006 | Anderson | G06F 17/30067 |
| 2006/0031916 | A1 | 2/2006 | Colter et al. | |
| 2007/0168539 | A1 * | 7/2007 | Day | H04N 7/17318 709/231 |
| 2007/0300264 | A1 * | 12/2007 | Turner | G06Q 30/02 725/60 |
| 2008/0239169 | A1 | 10/2008 | Moon et al. | |
| 2008/0244645 | A1 | 10/2008 | Moon et al. | |
| 2008/0282291 | A1 | 11/2008 | Henty | |
| 2009/0094197 | A1 | 4/2009 | Fein et al. | |
| 2009/0165047 | A1 * | 6/2009 | Paiz | H04N 5/44543 725/39 |
| 2009/0172746 | A1 | 7/2009 | Aldrey et al. | |
| 2009/0249400 | A1 | 10/2009 | Carlberg et al. | |
| 2010/0031162 | A1 | 2/2010 | Wiser et al. | |
| 2010/0063878 | A1 * | 3/2010 | Bachet | G06Q 30/0251 705/14.49 |
| 2010/0138868 | A1 * | 6/2010 | Sie | H04N 5/44543 725/46 |
| 2010/0262997 | A1 | 10/2010 | Dove | |
| 2010/0329644 | A1 | 12/2010 | Rosenfeld | |
| 2011/0113438 | A1 * | 5/2011 | Patil | H04N 7/17318 725/1 |
| 2011/0150432 | A1 * | 6/2011 | Paul | H04L 65/4084 386/297 |
| 2011/0176787 | A1 | 7/2011 | DeCamp | |
| 2011/0299836 | A1 | 12/2011 | Amsterdam et al. | |
| 2012/0284738 | A1 | 11/2012 | Narasimhan et al. | |
| 2013/0268975 | A1 | 10/2013 | Korst et al. | |
| 2016/0198231 | A1 | 7/2016 | Dubois et al. | |

OTHER PUBLICATIONS

"Non Final Office Action Issued in U.S. Appl. No. 16/120,725", dated Jan. 4, 2019, 15 Pages.

* cited by examiner

PRESENTING LINEAR AND NONLINEAR CONTENT VIA DVR

CROSS REFERENCE TO RELATED APPLICATIONS

The present application is a divisional of U.S. patent application Ser. No. 13/292,897 filed Nov. 9, 2011, the entire contents of which are incorporated herein by reference for all purposes.

BACKGROUND

Video content may be obtained from a variety of sources, including linear and non-linear sources. Linear content sources, such as broadcast television channels, provide content according to a specified schedule, whereas non-linear sources allow users to access available content on demand.

Digital Video Recorders (DVRs) often are utilized by television viewers to allow linear content to be consumed in an on-demand manner. DVRs may allow users to elect to record single instances of shows, or series of shows. After recording, a user may view a user-selectable list of recorded series and/or shows to choose a show for playback. In this manner, a DVR provides a user with the option of watching linear content whenever and as often as desired.

SUMMARY

Embodiments are disclosed that relate to the presentation of linear and non-linear content via a DVR system. For example, one disclosed embodiment provides, on a computing device, a method of identifying linear content and non-linear content for presentation via a video recording device. The method comprises detecting a trigger to perform a search for content items, and providing, responsive to the trigger, a search request to one or more metadata sources, each metadata source containing locations of one or more of linear content items and non-linear content items available at one or more content sources. The method further comprises receiving, responsive to the search request, from each metadata source a search response including metadata associated with available content at one or more of the content sources, and outputting a list of content items identifying one or more linear content items and one or more non-linear content items from one or more metadata sources.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, current DVR systems may be designed to allow the recording and later playback of linear content, thereby permitting time-shifted consumption of linear content. A user may designate individual shows for recording, or may designate entire series for recording. Some DVR systems also may provide access to a Video on Demand ("VOD") system of a linear content provider. In such DVR systems, access to such non-linear content may be provided via a different user interface screen than access to recorded linear content.

While current DVR systems may facilitate time-shifted consumption of video content, they also may suffer some drawbacks. For example, the definitions of series utilized by current DVR systems may be limited to multi-episode linear content series, such as television series. Thus, users wishing to view related non-linear content may have to seek out such content via other avenues, such as a through a computer network. Additionally, a user that schedules a show to record from a linear source may not be aware of an immediate availability of the show from a non-linear content source. Thus, the user may wait for the scheduled recording to occur, rather than choosing to view the show immediately from the non-linear content source. Similarly, a user of a current DVR system that joins a linear content broadcast midway through an item may not be aware that the full item is currently available at a non-linear content source. Thus, current DVR systems may lack the functionality to incorporate non-linear content with traditional linear content in a combined user experience.

Accordingly, embodiments are disclosed herein that relate to the presentation of linear content and non-linear content in an integrated user experience. As described in more detail below, the disclosed embodiments may allow a DVR system to present linear and non-linear content together in a single content series, as well as to alert a user when a desired linear content item may be available immediately and/or in full from a non-linear content source. It will be understood that the term "DVR system" as used herein refers to any system for providing an integrated user experience for both linear content and non-linear content, and may refer to systems in which content is recorded remotely instead of locally.

Figure 1:
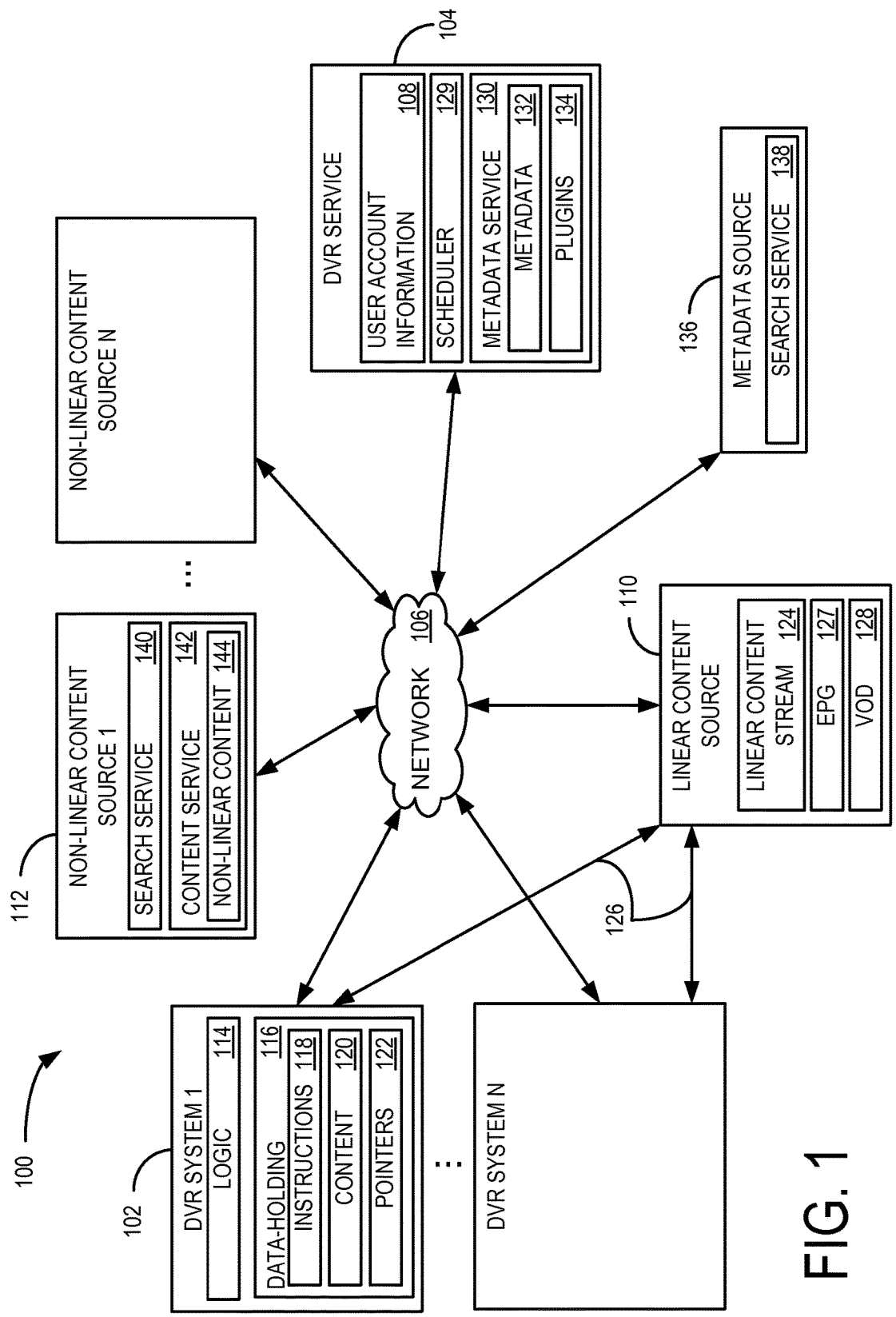
FIG. 1 shows an embodiment of an example use environment for providing non-linear content and linear content to one or more DVRs.

Prior to discussing these embodiments in detail, an example use environment 100 for providing linear and non-linear content via DVR systems is described with reference to FIG. 1. Use environment 100 comprises a plurality of DVR systems 102, illustrated as an arbitrary number n of DVR systems. Each DVR system 102 is connected to a remote DVR service 104 via a network 106. As discussed in more detail below, the remote DVR service 104 may be configured to schedule recordings of content items for each DVR system 102 based upon series definitions and other user account information 108 stored on the remote DVR service 104 for each DVR system 102. The content items scheduled for recording may be obtained from one or more linear content sources 110 and also one or more non-linear content sources 112. It will be understood that, in other embodiments, scheduling and/or other tasks described herein as being performed by DVR service 104 may be performed locally on each DVR system 102, or distributed between the DVR service 104 and each DVR system 102. Further, in some embodiments, the tasks described herein may be fully cloud-based, such that recording of linear content occurs remote from a user's playback locale, or may occur fully on a user's local device.

Each DVR system 102 is configured to record scheduled programs, and also to play back recorded programs upon user request. As such, each DVR system 102 comprises a logic subsystem 114 configured to execute instructions, and a data-holding subsystem 116 configured to store various data. For example, the data-holding subsystem 116 may store instructions 118 executable by the logic subsystem 114 to perform tasks related to recording and playback of content.

The data-holding subsystem 116 also may be configured to store recorded video content 120 and/or record pointers 122 to available non-linear content. As will be described in more detail below, the DVR systems 102 are configured to present linear and non-linear content in an integrated user experience. With regard to non-linear content, as such content may be available on-demand, the content may be accessed at any time without recording a local copy. Therefore, in such instances, local storage space may be conserved by storing a pointer to a non-linear content item, rather than a copy of the non-linear content item. In other instances, a copy of a non-linear content item may be stored instead of a pointer, e.g. if a non-linear content item is due to expire (e.g. will no longer be available at a content source), if a network connection between a DVR system and a non-linear content source is unreliable, if local storage is preferred by a user, etc.

The linear content source 110, as mentioned above, provides a stream of linear scheduled content 124 to each DVR system 102 via a direct channel 126, and/or via a computer network 106 (e.g. Internet Protocol Television "IPTV"). It will be understood that a "stream" may, but is not limited to, a continuous bit stream, and a group of files accessed in succession (e.g. fragmented MP4). Examples of suitable linear content sources 110 include, but are not limited to, cable television and satellite television providers. The linear content source 110 further may provide other information to DVR systems 102, such as an Electronic Program Guide 127 ("EPG"), and non-linear content by VOD 128. The direct channel 126 may take the form of a coaxial cable, fiber optic cable, satellite link, or any other communication channel suitable for delivering linear content. While the embodiment of FIG. 1 depicts a single linear content source 110 for clarity, it will be understood that DVR systems 102 also may receive linear content from more than one linear content source.

As mentioned above, in some embodiments, each DVR system 102 may be implemented as a client device configured to receive recording scheduling information from the DVR service 104 based upon user account information 108 stored on the DVR service 104. The DVR service 104 further comprises a scheduler 129 configured to determine where shows and series may be accessed for recording and/or playback, and to determine for each DVR system 102 scheduling information for local storage by each DVR system 102. Each DVR may then record and/or present content based upon the scheduling information received from the DVR service 104. In other embodiments, as mentioned above, these tasks may be performed in part or wholly on each DVR system 102.

The DVR service 104 may further comprise a metadata service 130 for storing and searching metadata related to content available for recording and/or playback. The metadata service 130 may be configured to receive content requests from the DVR service 104 and/or each DVR system 102, and in response, to obtain information regarding the availability of content that matches the queries. The metadata service 130 may query locally stored metadata 132 and/or external content sources. Locally stored metadata 132 may include previously received information, such as information from an electronic programming guide (EPG) 127 from linear content source 110, for example. This information may then be used by the DVR system 102 to schedule the recording of content and/or otherwise provide access to non-linear content. The metadata service 130 further may include plugins 134 for interfacing with external content sources, as explained in more detail below.

The use environment 100 further comprises a metadata source 136 located external to the metadata service 130 but that is accessible to the metadata service 130 and searchable via a search service 138. Such an external metadata source 136 may allow the metadata service 130 to access metadata not stored locally but that may contain information relevant to video content items of interest to users of the DVR systems 102. While the embodiment of FIG. 1 depicts a single external metadata source 136 for clarity, it will be understood that any suitable number of external metadata sources may be accessed by metadata service 130.

Each external non-linear content source 112 likewise may include a search service 140 with which the metadata service 130 can interface to discover available content on the non-linear content source through queries. Further, each external non-linear content source also comprises a content service 142 configured to deliver non-linear content 144 to end-user devices, such as DVR systems 102. Examples of suitable non-linear content sources include, but are not limited to, television content web sites, movie content web sites, user-uploaded video web sites, and social networking web sites. It will be understood that the delivery of non-linear content 144 may be accomplished via any acceptable delivery mechanism, including but not limited to, a continuous bit stream, and successive access to each file in a group of files (e.g. Fragmented MP4).

Figure 2:
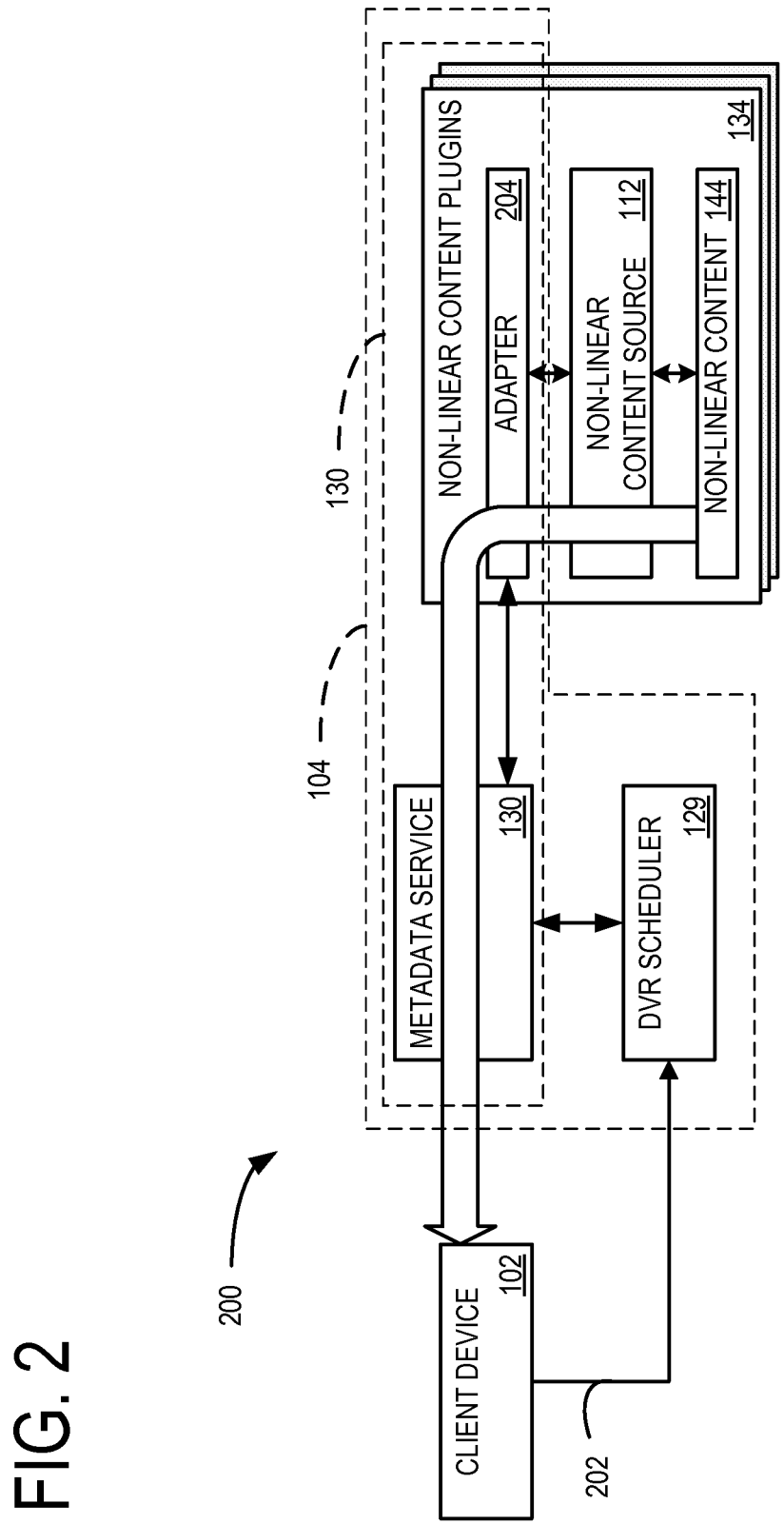
FIG. 2 shows an embodiment of a logical architecture of a system for providing non-linear content via a DVR.

FIG. 2 shows an embodiment of a logical architecture 200 of use environment 100. As mentioned above, the DVR service 104 may be triggered to search for information regarding linear and/or non-linear content to provide to the DVR system 102 as a recording schedule. Any suitable trigger may be used to trigger such a search. For example, such a search may be triggered when a user of the DVR system 102 inputs a request, as shown at 202. Such a request may comprise a request to view a particular show, a request to record a particular show, a request to record a series of shows, etc. A search trigger also may be programmatically generated by the scheduler 129, for example, to update a previously-defined series for a user.

Upon triggering, the scheduler 129 may initiate the search by providing a request to the metadata service 130 to conduct a metadata search. The metadata service 130 may search for relevant metadata locally (e.g. locally stored EPG data for a linear content source utilized by the requesting DVR system), and also may initiate searches for relevant content on external non-linear content sources.

The metadata service 130 may search for external non-linear content in any suitable manner. In the depicted embodiment, the aforementioned metadata service plugins 134 serve as interfaces between the metadata service 130 and external non-linear sources. The plugins 134 that are actually used in a search may be enabled and disabled through user selection. It will also be appreciated that new plugins may be added, such as through a system update process or through a user download.

Each plugin 134 is configured to interface with a particular corresponding external content source. As such, each plugin 134 may comprise an adapter 204 configured to translate metadata search queries provided to the plugin 134 into terms recognized by the corresponding external content source. Each plugin may supports the same type of search queries (e.g. search by title, program ID, series ID, and time/channel) as supported by the metadata service 130. Each plugin 134 also may be configured to provide authentication information, user account information, and/or other security information to corresponding external content sources that require such information for access. Such authentication information may be provided by a user in a setup process.

After performing any appropriate search query translation, each adapter 204 sends the search query, along with any appropriate authentication information, to the corresponding nonlinear content source 112, which searches for relevant content. Information regarding identified content, such as identifications of the content and the locations at which the identified content may be accessed, is then returned to the adapter 204, which returns the information to the metadata service 130 for provision to the scheduler 129. It will be appreciated that the depicted logical architecture 200 provides an extensible framework that allows the addition of external content source search capabilities simply by adding a plugin for each desired additional external content source.

Figure 3:
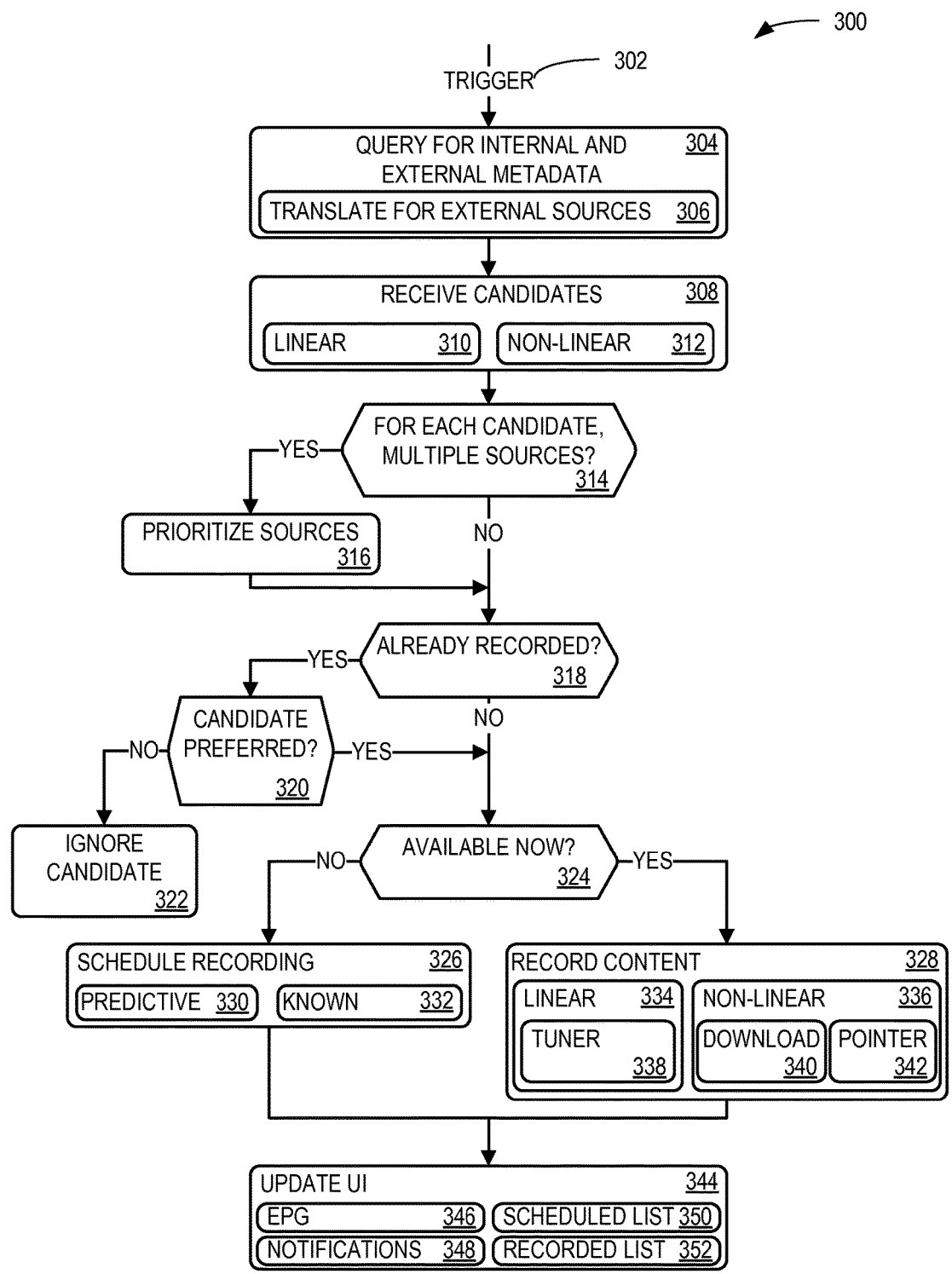
FIG. 3 shows a process flow depicting an embodiment of a method for providing linear content and non-linear content via a DVR.

FIG. 3 shows a flow diagram depicting an embodiment of a method 300 for providing linear content and non-linear content via a DVR. It will be understood that various processes of method 300 may be performed on a remote DVR service, locally on a DVR system, or distributed between the two. Method 300 comprises detecting a trigger 302, and at 304, performing a query for internal and external metadata in response to the trigger 302. The trigger 302 may be programmatically generated, or may be a result of user input. Further, as mentioned above, performing the query may include, at 306, translating the query for external sources. For example, translating the query may include converting information to and from the data format of the external content source application programming interfaces (APIs). Next, at 308, method 300 receives query candidates, which may include linear candidates 310 and non-linear candidates 312 identified from internal and/or external metadata searching.

At 314, method 300 comprises evaluating whether each candidate is available at multiple sources. If a candidate is available at multiple sources, method 300 may prioritize the sources at 316, and if not, method 300 proceeds to 318, discussed below. Sources may be prioritized based upon any suitable criteria. For example, in some embodiments, a DVR system user may specify one or more preferences. The preferences may be global (e.g. apply to all series) or may be specific to a particular series. For example, the user of the DVR may prefer content sources that allow downloading or recording over content sources that only allow for streaming. In another example, the user may prefer content sources at which the content is available immediately over content sources at which the content item may only be available at a later date. In another example, the DVR may automatically choose a lower-priority source over a higher-priority source if the higher-priority source is in use or unavailable. For example, if there are no more tuners available at that time to record from a (higher-priority) linear content source, the DVR may automatically choose a (lower-priority) non-linear content source. It will be understood that these methods of prioritizing content sources are presented for the purpose of example, and are not intended to be limiting in any manner.

Continuing, method 300 comprises, at 318, evaluating if each media content item has already been recorded. It will be understood that a media content item may be considered "previously recorded" if, for example, a copy of the item has been recorded to a storage device, a copy of the content item has been downloaded to a storage device, and/or a pointer to the content has been stored in a storage device. It will be further understood that "storage device" may refer to one or more local storage devices, one or more remote storage devices, or a combination thereof. If the media content item has already been recorded, method 300 continues to 320, and if not, method 300 continues to 324. At 320, method 300 comprises evaluating whether each content candidate is preferred over the previously recorded instance. If the previously recorded content is preferred, method 300 comprises ignoring the candidate, as indicated at 322. In this way, each content candidate may be compared against any previously recorded content to determine if the content is available from a preferred source. For example, a user may prefer to record a live airing of a television program in place of a streaming version that has been previously recorded.

At 324, method 300 comprises evaluating if each media content item is currently available. If the media content item is not currently available, then method 300 proceeds to 326, while if the media content item is currently available, method 300 proceeds to 328. At 326, method 300 comprises scheduling a recording of a media content item. The schedule may be predicted 330 or known 332. For example, if the schedule is known, the recording may be scheduled for a specific date and time provided by the content item. If the schedule is not known, then the recording may be scheduled for a predicted date and time based on previous availability from the content source. The schedule may also be predicted using information (e.g. time/date of the original airing, time/date of future airings of the program and/or series, etc.) provided by a linear content source, a non-linear content source, or a metadata source. At the predicted time, the content item may be recorded if available, or the predicted time may be updated if the content is still unavailable. Method 300 then proceeds to 344, discussed below.

At 328, method 300 comprises recording currently available content. The content may be linear content 334 or non-linear content 336. The linear content 334 may be recorded using a tuner 338. Tuner 338 may include, but is not limited to, one or more hardware-based tuners (e.g. Radio Frequency "RF" tuner), one or more software-based tuners (e.g. IPTV tuner), or a combination thereof. The non-linear content 336 may be recorded via download 340 or storage of a pointer 342, wherein the pointer may comprise a URL or other unique identifier of the location of the non-linear content 336. Method 300 then proceeds to 344.

At 344, method 300 comprises updating the user interface to reflect changes made at 326 or 328. Method 300 may update an EPG 346, provide one or more notifications 348, update a scheduled recording list 350, and/or update a recorded items list 352. The notifications may include but are not limited to EPG text and/or icons, messages overlaying playback of media content, or general user notifications. Examples of such notifications are described in more detail below.

Figure 4:
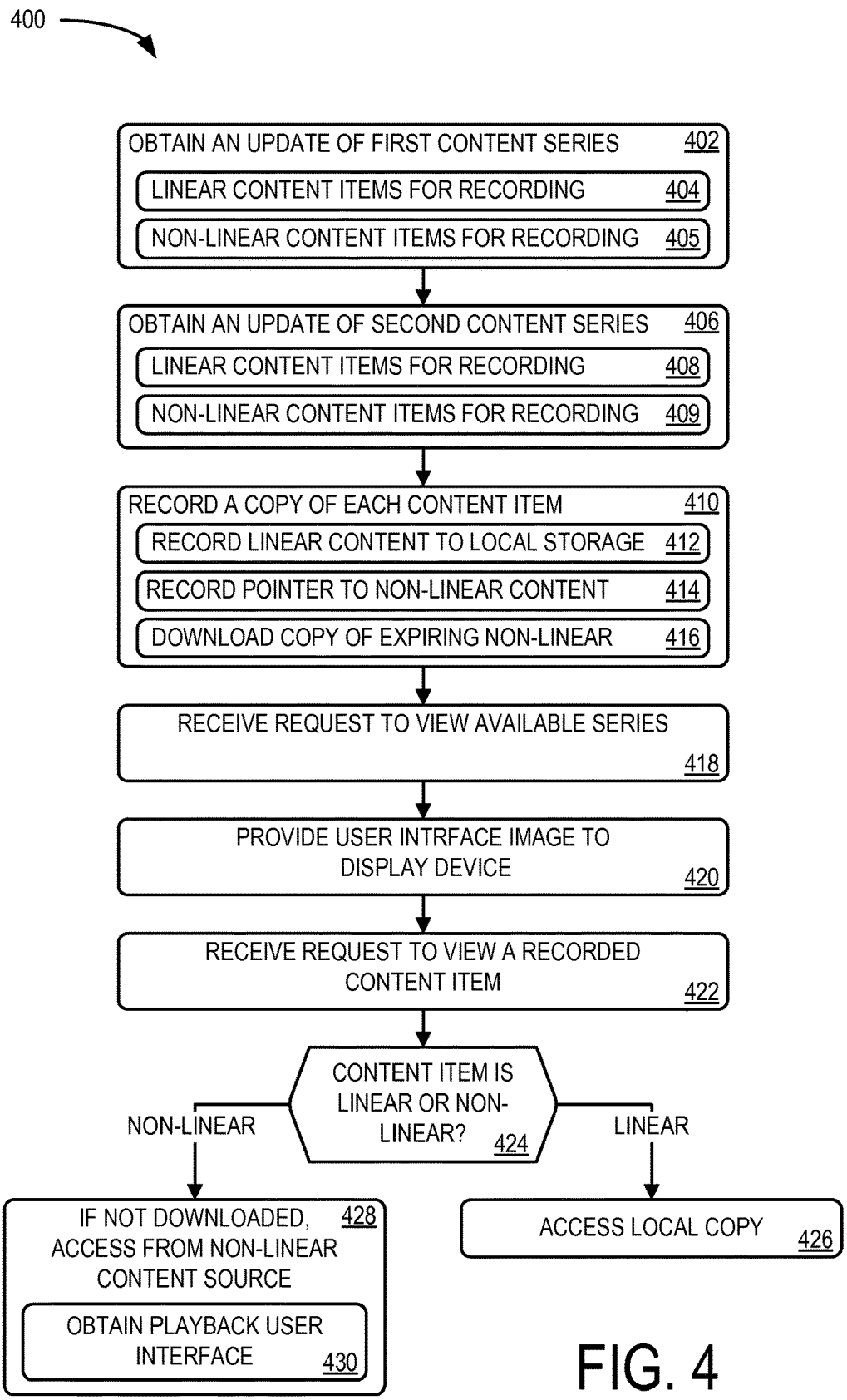
FIG. 4 shows a process flow depicting an embodiment of a method for providing linear content and non-linear content to a user of a DVR.

The identification of linear and non-linear content as described above may allow linear and non-linear content to be presented together in a common user interface, thereby presenting an integrated user experience. FIG. 4 shows a process flow depicting an embodiment of a method 400 for providing linear content and non-linear content to a user of a DVR in an integrated experience. At 402, method 400 comprises obtaining an update for a first content series. This update may include one or more linear content items for recording 404 and/or one or more non-linear content items for recording 405. At 406, method 400 may comprise obtaining an update for a second content series. This update likewise may include one or more linear content items for recording 408 and/or one or more non-linear content items for recording 409.

The update for linear content items 404 and/or 405 may be obtained locally at a DVR system, for example, based upon an updated EPG received by the DVR system, or may be obtained from a remote DVR service. The non-linear content items 405 and/or 409 may include streaming content, or content that is available for download. It will be understood that the first content series and/or the second content series each may comprise any combination of non-linear content items and linear content items.

At 410, method 400 may record a copy of each content item. If the content is linear, a copy may be recorded to local storage at 412. In other embodiments, the linear content may be recorded to storage at a remote server that is then accessible by a client DVR device, or at any other suitable location. If the content is non-linear, recording of the content may include storing a pointer to the content at 414, or downloading a copy of expiring non-linear content at 416. In this way, the non-linear content may be accessed by streaming in order to conserve storage space. Further, if the content is set to expire from the streaming service, the non-linear content may be downloaded in order to ensure persistent access to the content (e.g. when a user has selected "keep until deleted" during scheduling). Further still, if a non-linear content item has previously been recorded when a user selects "keep until deleted", the content item may be downloaded. If a download is not possible (e.g. the non-linear content source does not allow downloading), a new recording from another content source may be scheduled and may replace the previous content item once available. At 418, method 400 may comprise receiving a request to view available series, and in response, providing a user interface image to a display device, wherein the user interface image includes a representation of the first content series and/or the second content series. For example, the user interface image may include a listing of scheduled and recorded content for each series. In this manner, non-linear content and linear content selections are presented on a common user interface for user convenience.

After display of the user interface image, method 400, at 422, may comprise receiving a request to view a recorded content item. As indicated at 424, the presentation of the content item may differ depending upon whether the item is linear or non-linear. If the content is linear, method 400 may comprise accessing a locally stored copy, as indicated at 426. Likewise, if the content is non-linear, method 400 may comprise accessing the content from a non-linear content source, as indicated at 428. Further, when accessing the non-linear content, method 400 may also comprise obtain a playback user interface, as indicated at 430. For example, in some instances, a non-linear content source may allow for playback within its playback experience user interface. As such, the user interface may be obtained along with the non-linear content from the non-linear content source. In other instances, a locally-stored playback user interface may be utilized. Further, as indicated at 428, if the non-linear content has been previously downloaded, the downloaded copy may be accessed instead of the non-linear content source.

Figure 5:
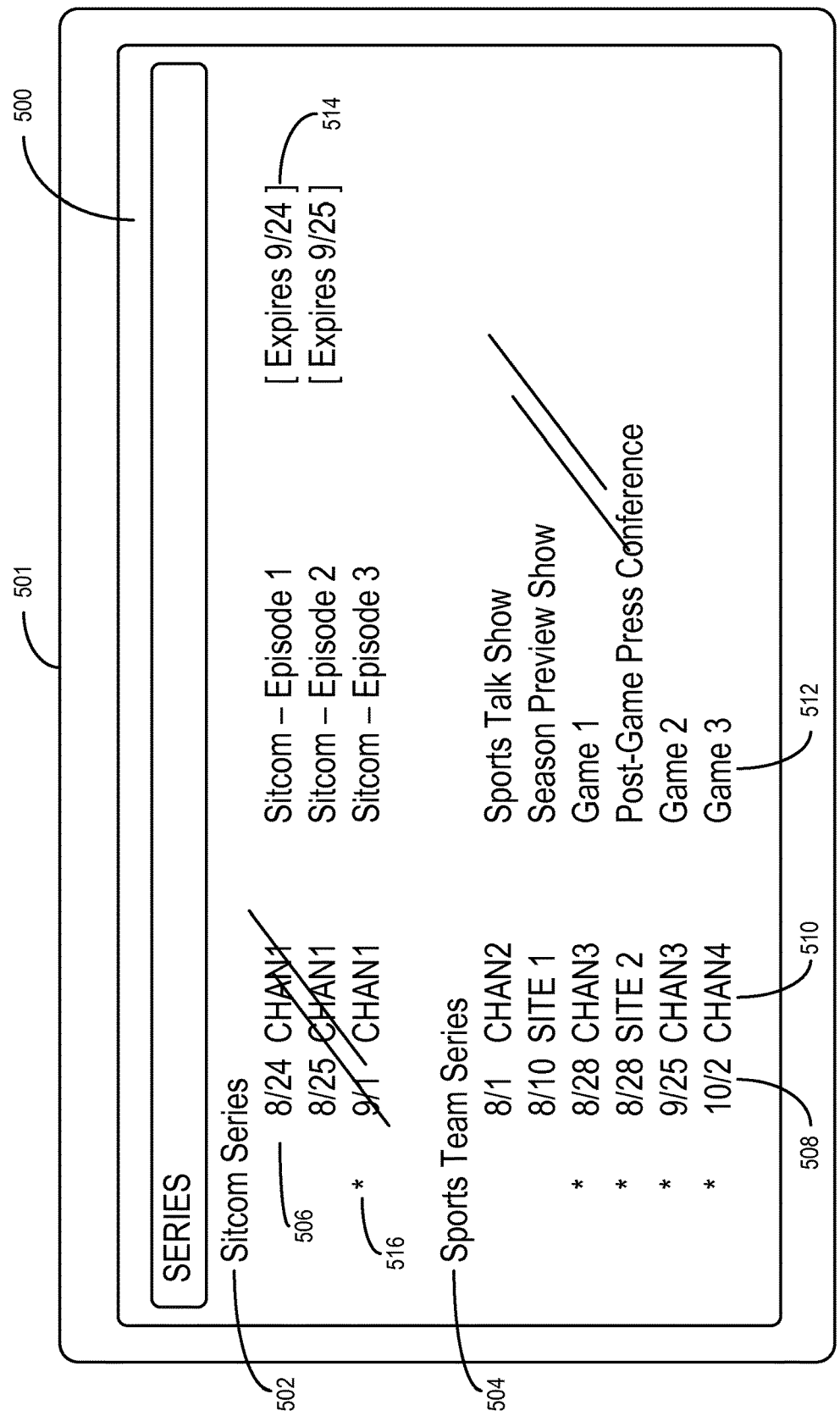
FIG. 5 shows an embodiment of a user interface for providing a list view of available series.

FIG. 5 shows an embodiment of a user interface 500 displayed on a display device 501, in which linear and non-linear content are presented together in an integrated user experience. In the specific example of FIG. 5, the user interface provides a list view of series recorded by a user comprising a first series 502 (illustrated as "Sitcom Series") and a second series 504 (illustrated as "Sports Team Series"). It will be appreciated that the term "series" may refer to any collection of recorded/to-be recorded content related by any commonality. For example, a series may comprise multiple episodes of a single television show (e.g. series 502), multiple video content items recommended by a particular person or group of person, multiple video content items related by subject matter, such as a sports team (e.g. series 504), combinations thereof, and/or based upon any other suitable criteria.

Each series 502 or 504 may include one or more content items 506. The display of content items 506 may include such information as date recorded/date scheduled to be recorded 508, source of content item 510, title of content item 512, and/or expiration date 514. Further, a designator 516 (illustrated here as an asterisk) may be displayed to alert the user to a content item that is scheduled but not yet available. In the case of non-linear content, date 508 may indicate the predicted or known time the content item will be available, as discussed above regarding FIG. 3.

Designator 516 may have any suitable appearance. For example, in some embodiments, a designator 516 may comprise a change in the color or size of content item 506. For example, content items that are not yet available may be grayed-out. In other embodiments, a designator may not be shown. Instead, content items that are not yet available may not be displayed in a same user interface image as content items that are already available.

Expiration date 514 may indicate a content item 506 may no longer be available. If the content item 506 is linear, the expiration date 514 may indicate the time at which the content item will be deleted from a local and/or remote storage. A linear content item may expire due to a user preference (e.g. keep program for 30 days) or may be programmatically removed in order to allow for further recordings (e.g. keep program until more space is needed). If the content item 506 is non-linear, the expiration date 514 may indicate the time at which the content item will no longer be available from a non-linear content source. Although it is depicted as text, expiration date 514 may have any suitable appearance. For example, an upcoming expiration date 514 may be represented with an icon (e.g. an exclamation point). In other embodiments, expiration date may not be shown. Instead, content items that are about to be expired may be represented with a different size and/or color of text.

Figure 6:
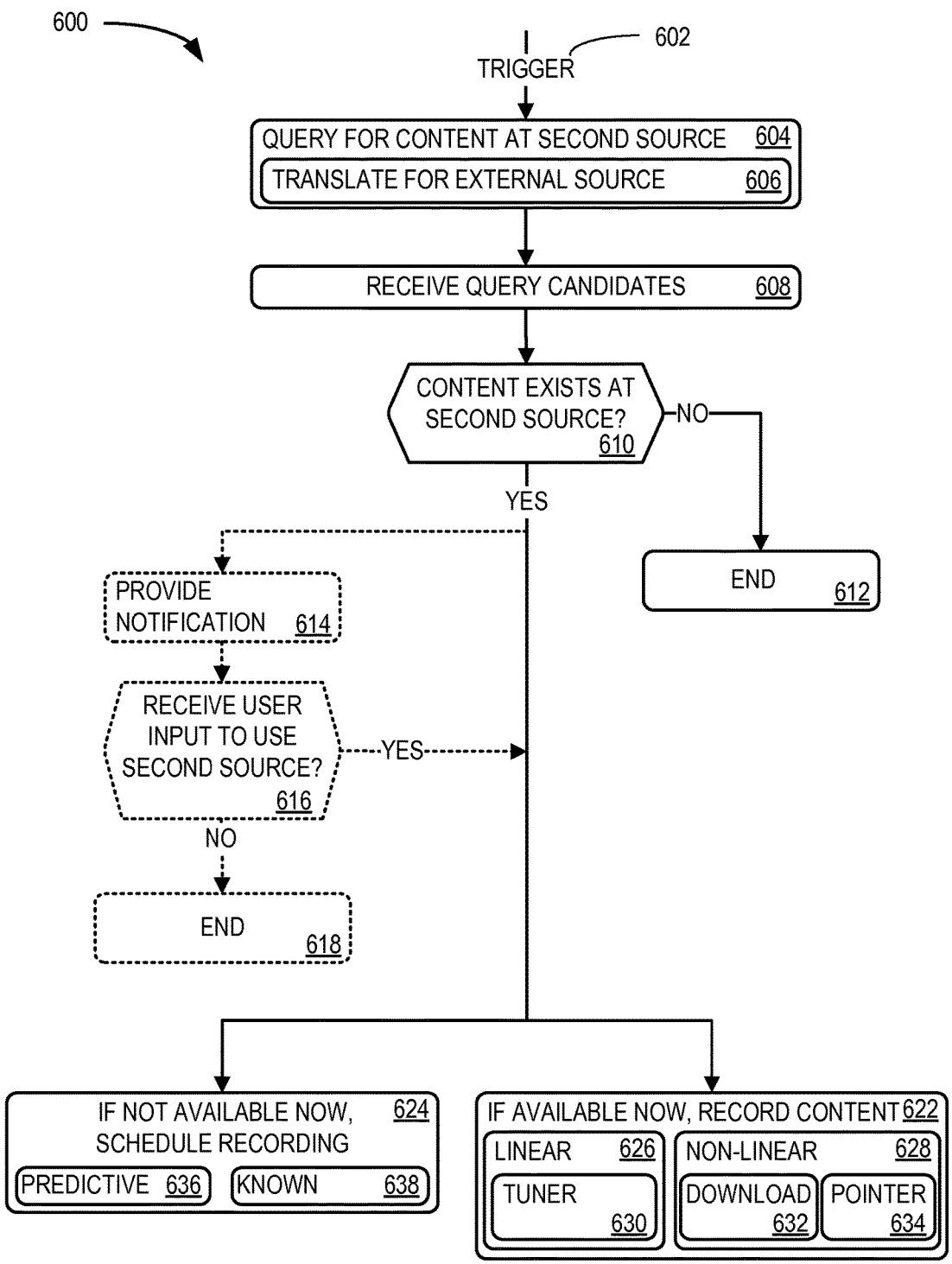
FIG. 6 shows a process flow depicting an embodiment method of providing a notification alerting a user of a video recording device to an alternate source of a content item.

The use of multiple content sources may result in a particular content item being available from more than one content source. FIG. 6 shows a process flow depicting an embodiment of a method 600 of providing a notification alerting a user of a video recording device to an alternate source of a content item. Method 600 comprises receiving a trigger 602. The trigger may be generated by any suitable event. For example, the trigger may be programmatically generated when a user requests to access a content item at a first content source. In another example, the trigger may be generated when a user attempts to record or view a show that is already in progress.

At 604, method 600 comprises querying for content from a second content source in response to trigger 602, wherein the second content source comprises a more linear content source or a non-linear content source. Querying may include, at 606, translating the query for an external content source to interface with an external source's APIs. It will be understood that the query may be sent to any suitable number of second content sources.

Next, at 608, method 600 comprises receiving query candidates from one or more content sources. From the query candidates, at 610, method 600 next evaluates if the content is available from a second source. It will be understood that content "available" at a second source is not necessarily "available now". In other words, content "available" at a second source may be available for recording/viewing at a later date. If the content is not available, method 600 ends at 612. On the other hand, if the content is available, then method 600 moves to 620. Such behavior may be defined by one or more of system settings and user-defined settings for automatically switching to the second source.

In some embodiments, method 600 may instead comprise providing notification to the user at 614. In some instances, the notification may comprise a user interface configured to accept user input, as shown at 616, while the notification may be passive in other instances. If user input is not received to access the content from the second source, then method 600 ends at 618. On the other hand, if user input is received, then method 600 proceeds to 622 or 624.

If the content is available immediately, method 600 comprises recording the content at 622. Immediately available content may comprise a previously recorded copy, content available for streaming/download, content currently being broadcast, or content available via VOD, among others. If the content is not available immediately, method 600 comprises scheduling a future recording of the content at 624.

The content recorded at 622 may be linear content 626 or non-linear content 628. The linear content 626 may be recorded using a tuner 630, while non-linear content 628 may be recorded via download 632 of the content, or storage of a pointer 634. The pointer may be a URL or other unique identifier of the location of the non-linear content 628. Tuner 630 may include, but is not limited to, one or more hardware-based tuners (e.g. RF tuner), one or more software-based tuners (e.g. IPTV tuner), or a combination thereof.

The scheduled recording at 624 may be predicted 636 or known 638. For example, if the schedule is known, the recording may be scheduled for a specific date and time provided by the content item. If the schedule is predicted, the recording may be scheduled for a date and time based on previous availability from the content source. The schedule may also be predicted using information (e.g. time/date of the original airing, time/date of future airings of the program and/or series, etc.) provided by a linear content source, a non-linear content source, or a metadata source. At the predicted time, the content item may be recorded if available, or the predicted time may be updated if the content is still unavailable.

Figure 7:
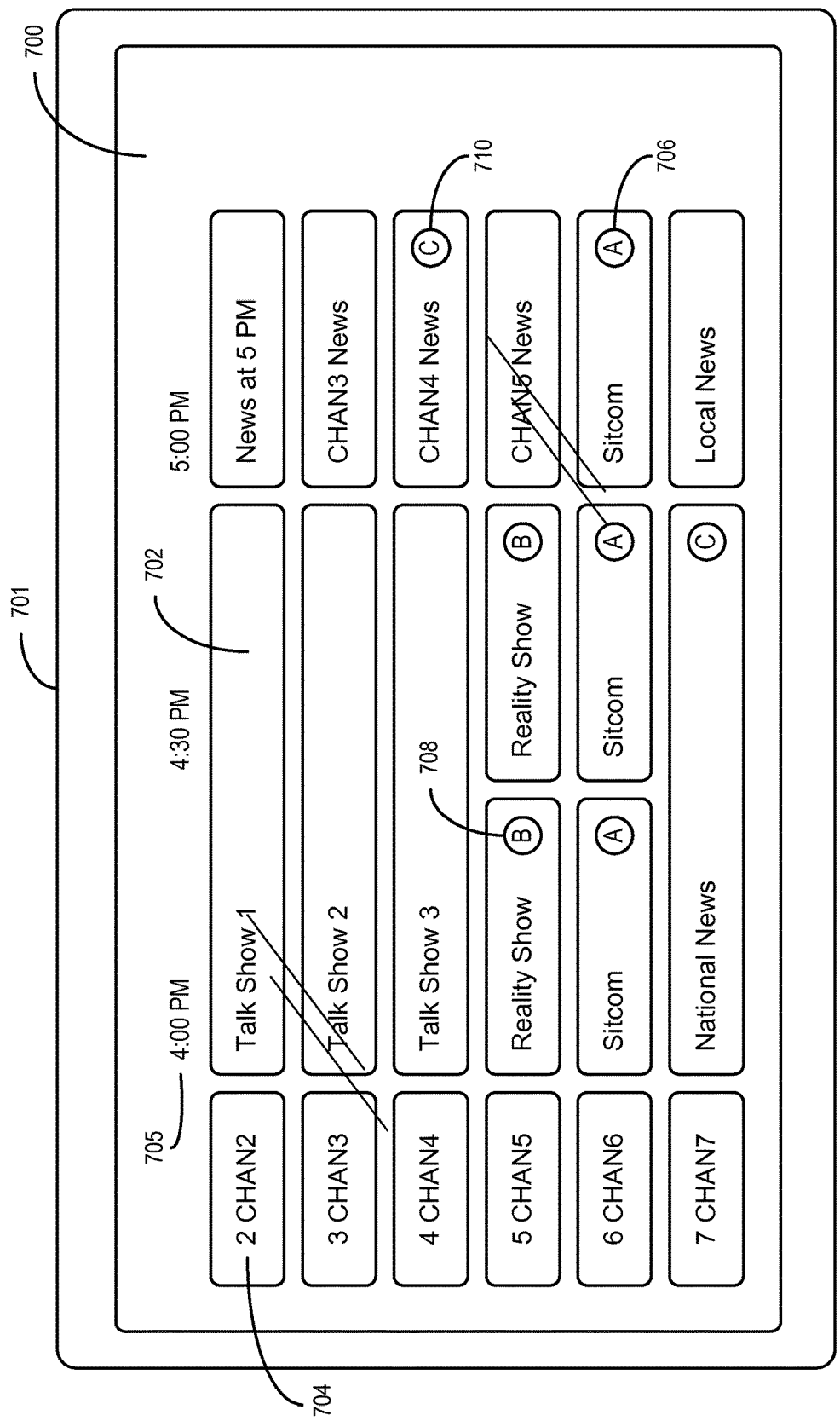
FIG. 7 shows an embodiment of a user interface providing an electronic program guide with notifications.

In some DVR systems, there may exist one or more user interfaces for initiating playback and recording. For example, the user interfaces may include an EPG, a search interface, a browsing interface, and the like. As such, user notification within the one or more interfaces regarding the existence of a media content item at a second content source may be helpful in alerting a user of an alternate content source. FIG. 7 shows an embodiment of a user interface 700 displayed on a display device, wherein the notifications are provided within an EPG. The EPG of user interface 700 may include a grid of current and upcoming shows 702 available from a plurality of channels 704. The grid may be divided into blocks of time 705 indicating the duration of the individual shows.

The user interface 700 may further include one or more designators 706, 708 and 710 associated with a show 702 that indicate that the designated show is available to watch now.

Designator 706 may indicate that the designated show is available to watch now. For example, the show may have been previously recorded, or may be currently available from a non-linear content source. Further, the designator 706 may be interactive, such that user selection of designator 706 or a show 702 associated with designator 706 may cause the program to begin playing. In other embodiments, such as when the content is available from multiple sources, the user selection may cause the display of a selectable list of sources for the show.

Designator 708 also may indicate the show is scheduled to be recorded at some other time and/or channel. User selection of designator 708 or a show 702 associated with designator 708 may cause the display of text indicating that the show is scheduled to record at a different time and/or channel. A user-selectable link to view and/or modify the details of the scheduled recording may also be displayed.

Designator 710 further may indicate that the designated show is scheduled to be recorded at that time and channel. User selection of designator 710 or a show 702 associated with designator 710 may cause the display of text indicating that the show is scheduled to record at that time and/or channel. A user-selectable link to view and/or modify the details of the scheduled recording may also be displayed.

The designators 706, 708, 710 may have any suitable appearance. For example, in some embodiments, one or more of the designators may be text and/or graphics separate from the displayed show information, as shown in FIG. 7. In other embodiments, one or more of the designators may be indicated by a change in the color or size of the text and/or background of the displayed show information. In other embodiments, the designators may have a same appearance. It will be understood that these visualizations are presented for the purpose of example, and are not intended to be limiting in any manner. It will be further understood that such designators may be omitted.

Figure 8:
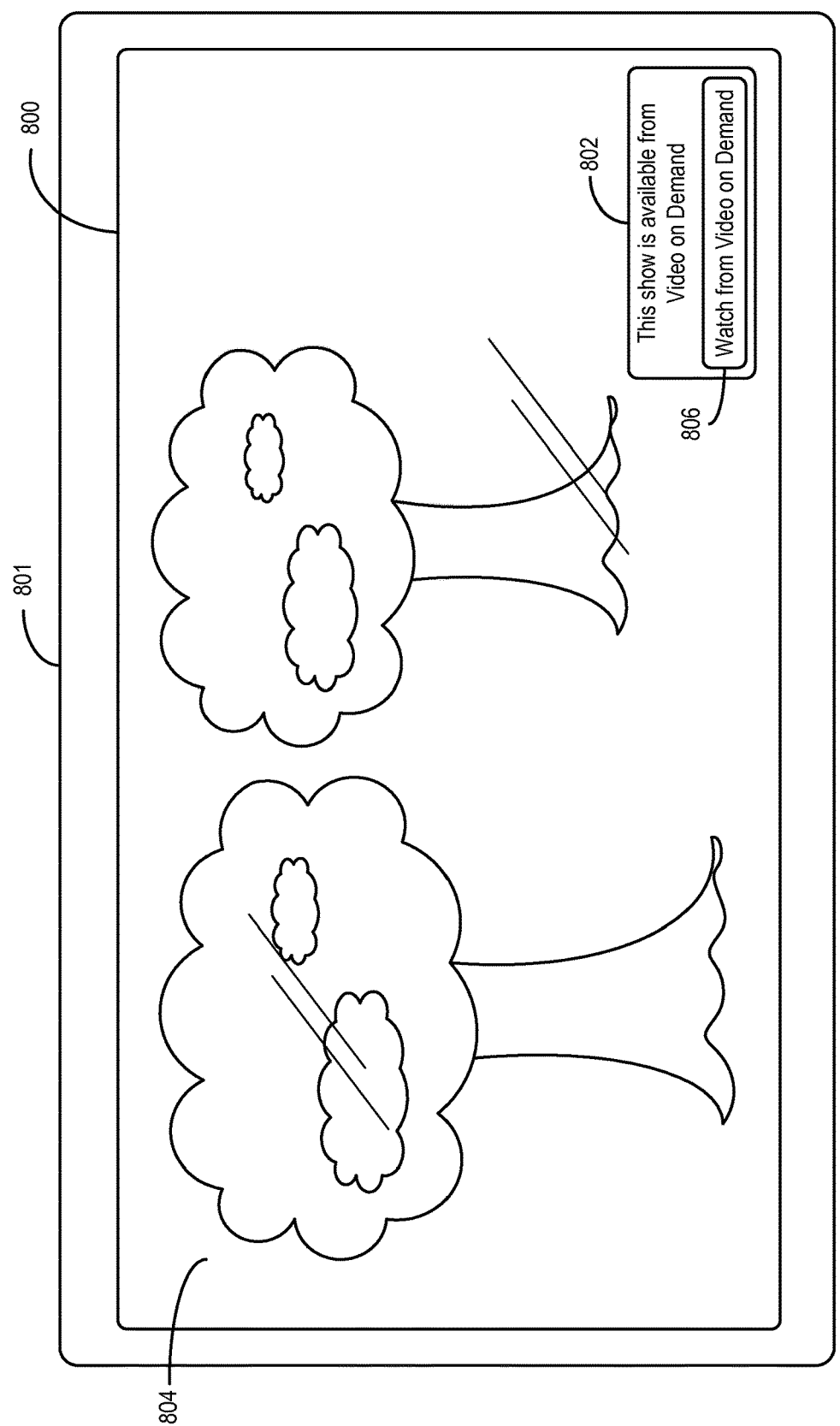
FIG. 8 shows an embodiment of a user interface providing a notification to a user during content playback.

In some instances, the EPG may not be used as the entry point for a particular show (e.g. during "channel surfing"). Thus user notification outside the EPG regarding the existence of a media content item at a second content source may be desired. FIG. 8 shows an embodiment of a user interface 800 providing a notification 802 to a user during playback of content 804 on display device 801. The notification 802 may alert a user to the existence of content 804 from another content source. For example, if the user beings watching content 804 in the middle of playback, the notification 802 may alert the user to the immediate availability of a complete version at some other source. Presentation of notification 802 may be delayed for an amount of time to ensure that the user is interested in watching the content and is not just channel surfing.

While the notification 802 is illustrated as a dialog box in the including text, it will be understood that the notification 802 may be of any suitable form. For example, in some embodiments, notification 802 may comprise an audio notification such as a "chime" and/or a verbal message. The verbal message may be computer-generated and/or pre-recorded. In other embodiments, notification 802 may be a visually distinctive graphical icon. Notification 802 may further include a user-selectable item 806. This user-selectable item may be a button or link that allows the user to access content 804 from the second content source.

The above described methods and processes may be tied to a computing system including one or more computers. For example, referring again to FIG. 1, each DVR system 102 and the DVR service 104 may be implemented as a computer application, computer service, computer API, computer library, and/or other computer program product.

Figure 9:
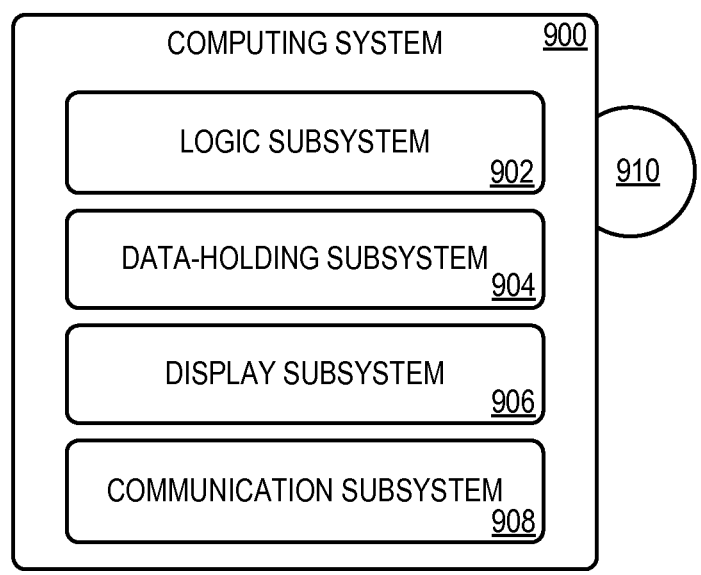
FIG. 9 schematically shows an example embodiment of a computing system.

FIG. 9 schematically shows a nonlimiting computing system 900 that may perform one or more of the above described methods and processes. Computing system 900 is shown in simplified form. It is to be understood that virtually any computer architecture may be used without departing from the scope of this disclosure. In different embodiments, computing system 900 may take the form of a mainframe computer, server computer, desktop computer, laptop computer, tablet computer, home entertainment computer, network computing device, mobile computing device, mobile communication device, gaming device, etc.

Computing system 900 includes a logic subsystem 902 and a data-holding subsystem 904. Computing system 900 may optionally include a display subsystem 906, communication subsystem 908, and/or other components not shown in FIG. 9. Computing system 900 may also optionally include user input devices such as remote controls, keyboards, mice, game controllers, cameras, microphones, and/or touch screens, for example.

Logic subsystem 902 may include one or more physical devices configured to execute one or more instructions. For example, logic subsystem 902 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 902 may include one or more processors that are configured to execute software instructions. Additionally or alternatively, logic subsystem 902 may include one or more hardware or firmware logic machines configured to execute hardware or firmware instructions. Processors of logic subsystem 902 may be single core or multicore, and the programs executed thereon may be configured for parallel or distributed processing. Logic subsystem 902 may optionally include individual components that are distributed throughout two or more devices, which may be remotely located and/or configured for coordinated processing. One or more aspects of logic subsystem 902 may be virtualized and executed by remotely accessible networked computing devices configured in a cloud computing configuration.

Data-holding subsystem 904 may include one or more physical, non-transitory, devices configured to hold data and/or instructions executable by logic subsystem 902 to implement the herein described methods and processes. When such methods and processes are implemented, the state of data-holding subsystem 904 may be transformed (e.g., to hold different data).

Data-holding subsystem 904 may include removable media and/or built-in devices. Data-holding subsystem 904 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 904 may include devices with one or more of the following characteristics: volatile, nonvolatile, dynamic, static, read/write, read-only, random access, sequential access, location addressable, file addressable, and content addressable. In some embodiments, logic subsystem 902 and data-holding subsystem 904 may be integrated into one or more common devices, such as an application specific integrated circuit or a system on a chip.

FIG. 9 also shows an aspect of the data-holding subsystem in the form of removable computer-readable storage media 910, which may be used to store and/or transfer data and/or instructions executable to implement the herein described methods and processes. Removable computer-readable storage media 910 may take the form of CDs, DVDs, HD-DVDs, Blu-Ray Discs, EEPROMs, and/or floppy disks, among others.

It is to be appreciated that data-holding subsystem 904 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

It is to be appreciated that a "service", as used herein, may be an application program executable locally and/or across one or more user sessions and available to one or more system components, programs, and/or other services. In some implementations, a service may run on a server responsive to a request from a client.

When included, display subsystem 906 may be used to present a visual representation of data held by data-holding subsystem 904. As the herein described methods and processes change the data held by the data-holding subsystem, and thus transform the state of the data-holding subsystem, the state of display subsystem 906 may likewise be transformed to visually represent changes in the underlying data. Display subsystem 906 may include one or more display devices utilizing virtually any type of technology. Such display devices may be combined with logic subsystem 902 and/or data-holding subsystem 904 in a shared enclosure, or such display devices may be peripheral display devices.

When included, communication subsystem 908 may be configured to communicatively couple computing system 900 with one or more other computing devices. Communication subsystem 908 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 900 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
a logic subsystem; and
a data-holding subsystem storing recorded video content and computer-readable instructions that are executable by the logic subsystem to
detect, via execution of the instructions, a trigger to perform a search for content items;
send, responsive to the trigger, a search request to one or more metadata sources located at one or more remote computing devices, each metadata source containing information regarding locations of one or more of scheduled content items and on-demand content items at one or more content sources;
receive responsive to the search request, from each remote computing device of the one or more remote computing devices a search response including metadata associated with available content at the one or more content sources;
output to a display device a list of content items identifying one or more selected scheduled content items and one or more selected on-demand content items from the one or more metadata sources;
compare, via execution of the instructions, metadata received from the one or more remote computing devices to determine whether a particular scheduled content item of the one or more selected scheduled content items is available from an on-demand content source; and
during presentation of the particular scheduled content item, based at least on presentation of the particular scheduled content item beginning when the particular scheduled content item is already in progress and on the particular scheduled content item being available from an on-demand content source,
generating the output of a notification that the particular scheduled content item is available from the on-demand content source.

2. The computing device of claim 1, wherein the trigger comprises one or more of a user input to record a video program, a user input to view a video program, a user input to update recording preferences, and an automated request to update series information.

3. The computing device of claim 1, wherein the instructions are executable to provide the search request to a local metadata source.

4. The computing device of claim 1, wherein the instructions are executable to provide the search request to one or more remote metadata sources via a computer network.

5. The computing device of claim 4, wherein the instructions are further executable to translate the search request for each remote metadata source prior to sending the search request to the remote metadata source.

6. The computing device of claim 4, wherein the instructions are further executable to provide account access information for a secure remote metadata source.

7. The computing device of claim 1, wherein outputting the list of content items further comprises one or more of:
providing a user interface listing previously recorded scheduled content items and immediately available on-demand content items; and
providing a user interface comprising scheduled content items and on-demand content items scheduled for recording.

8. The computing device of claim 1, wherein outputting the list of content items comprises outputting a user interface image comprising one or more of the selected scheduled content items and one or more of the selected on-demand content items in the user interface image.

9. The computing device of claim 1, wherein the instructions are executable to prioritize the list of one or more selected scheduled content items and one or more on-demand content items by one or more of user preference and content source availability.

10. A video recording device configured to provide access to scheduled content and on-demand content, the video recording device comprising:
a logic subsystem; and
a data-holding subsystem comprising instructions stored thereon that are executable by the logic subsystem to
obtain via a computer network an update of a first content series, the update of the first content series identifying a first list of content items for recording, the first list of content items comprising one or more scheduled content items available via broadcast and one or more on-demand content items available via a computer network;
obtain via the computer network an update for a second content series, the update of the second content series identifying a second list of content items for recording, the second list of content items comprising one or more scheduled content items available via broadcast and one or more on-demand content items available via the computer network;
record each of the one or more scheduled content items from one or more scheduled content sources according to a scheduled presentation time for each scheduled content item;
receive, via execution of the instructions, a user input requesting to view available series; and
in response, provide to a display device a user interface image comprising a representation of the first content series and a representation of the second content series, the representation of the first content series showing representations of the one or more scheduled content items and representations of the one or more on-demand content items of the first list grouped as the first content series, and the representation of the second content series showing representations of the one or more scheduled content items and representations of the one or more on-demand content items of the second list grouped as the second content series.

11. The video recording device of claim 10, wherein the instructions are executable to record each on-demand content item by recording a pointer indicating a remote location from which the on-demand content item is obtainable.

12. The video recording device of claim 11, wherein the instructions are executable to record a copy of an expiring on-demand content item prior to an expiration of the expiring on-demand content item.

13. The video recording device of claim 11, wherein the instructions are further executable to receive a user input requesting to view a selected on-demand content item, and in response obtain the selected on-demand content item from the remote location indicated by the pointer for the selected on-demand content item.

14. The video recording device of claim 10, wherein the instructions are further executable to receive a playback user interface from the remote location along with the selected on-demand content item.

15. The video recording device of claim 10, wherein the instructions are further executable to utilize a locally stored user interface for playback of on-demand content.

* * * * *